Oct. 19, 1926.
M. L. FOX
1,603,944
ROOT WASHER
Filed August 11, 1925    2 Sheets-Sheet 1
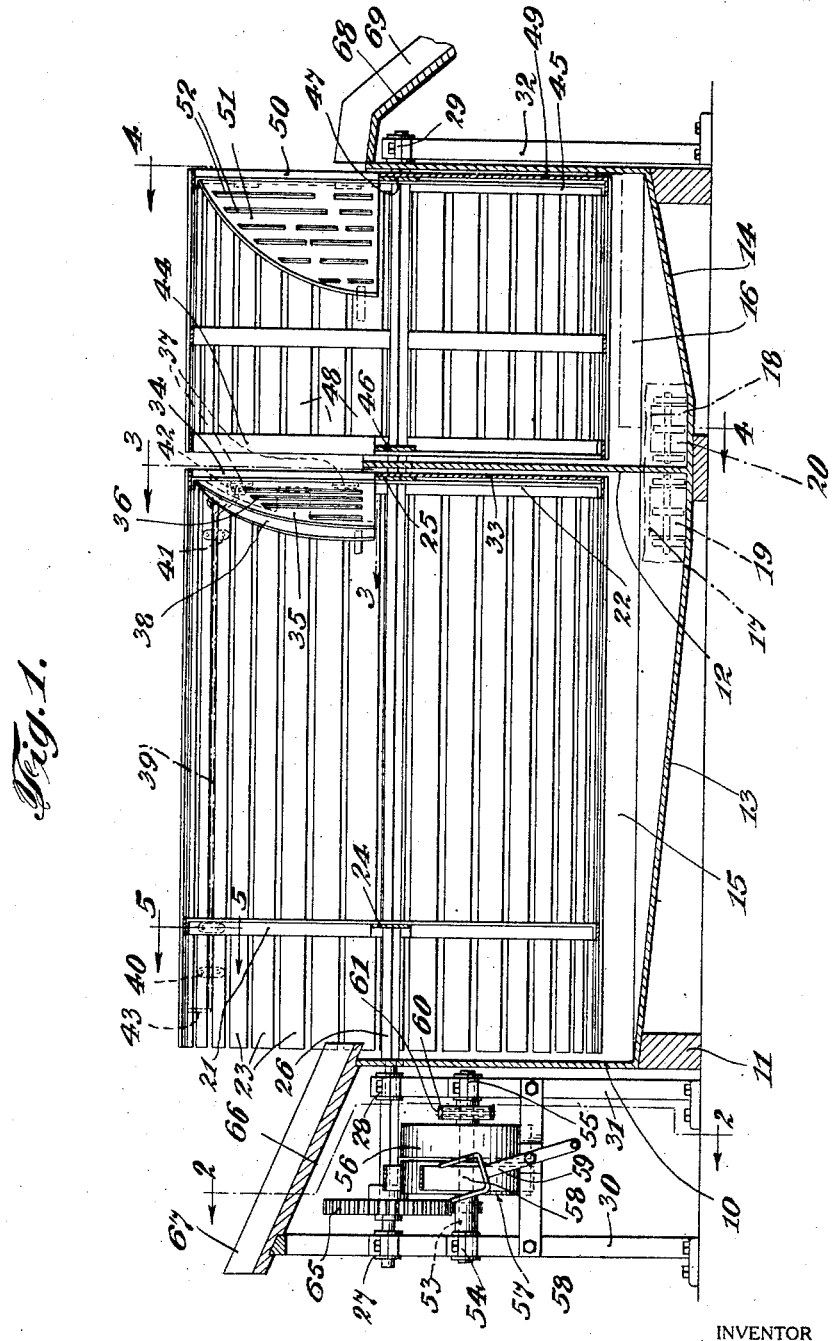
INVENTOR
Matthew L. Fox
BY
his ATTORNEYS Oct. 19, 1926.
M. L. FOX
ROOT WASHER
Filed August 11, 1925   2 Sheets-Sheet 2
1,603,944
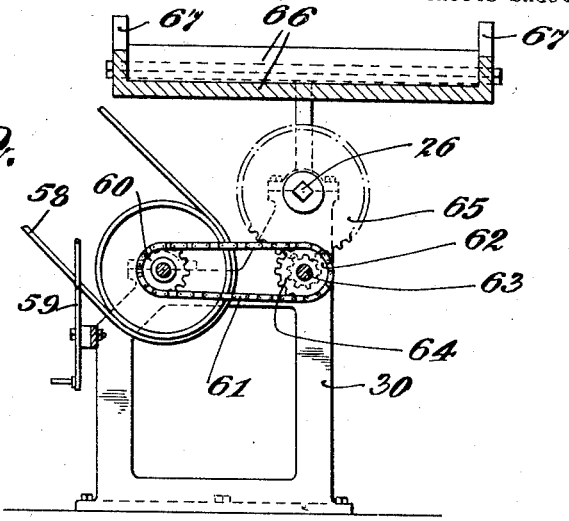
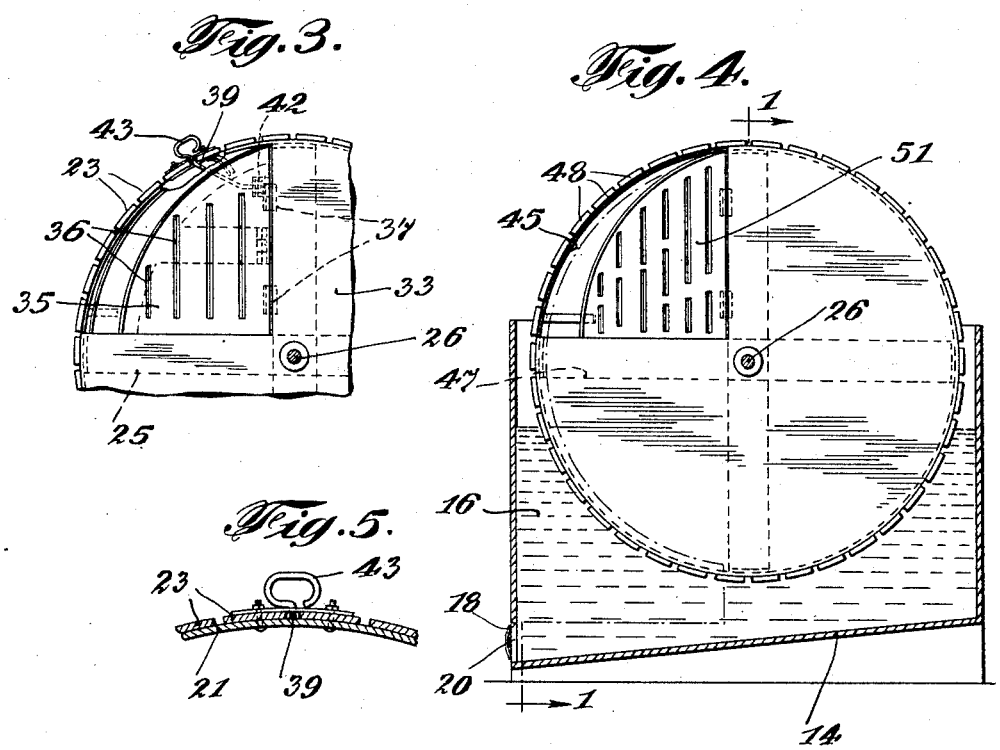
INVENTOR
Matthew L. Fox
BY
his ATTORNEYS Patented Oct. 19, 1926.

1,603,944

UNITED STATES PATENT OFFICE.

MATTHEW L. FOX, OF NORTH BELLMORE, NEW YORK, ASSIGNOR OF ONE-THIRD TO OTTO KAMPFE, OF BELLMORE, NEW YORK.

ROOT WASHER.

Application filed August 11, 1925. Serial No. 49,505.

This invention relates to an apparatus for washing roots of vegetables and other similar articles when taken from the ground, so as to remove the dirt, and to prepare the same in a preliminary manner for the market and for use. In carrying out the invention the apparatus made in accordance therewith preferably comprises a tank or receptacle divided into compartments in which there are mounted revoluble drums, a drum being mounted in each compartment, and the drums being preferably connected so as to turn in unison. The roots or vegetables, or other articles to be cleaned are admitted to one of the drums where they are washed, and by suitable devices are then automatically transferred to the next succeeding drum where they are rinsed or further cleaned, and are then finally automatically delivered from the apparatus, suitable means being employed to turn the drums and to set the devices for delivering the roots, vegetables or other articles from one drum or another as will be hereinafter more particularly described.

In the drawing:

Fig. 1 is a longitudinal elevation and partial section illustrating a root washer made in accordance with my invention.

Fig. 2 is an end elevation and partial cross-section showing the apparatus for operating the drums, the same being taken on line 2—2, Fig. 1.

Fig. 3 is a sectional elevation on line 3—3, Fig. 1.

Fig. 4 is a sectional elevation on line 4—4, Fig. 1, and

Fig. 5 is a section on line 5—5, Fig. 1.

My present invention relates to a machine for washing roots and certain vegetables, as for example, potatoes, carrots, turnips, onions and the like as taken from the ground, in order to remove the earth from the same by a cleansing process, and thus to prepare the articles in a preliminary way for the market and for use. As shown in the drawing the washer comprising my present invention consists of a tank or receptacle 10, having a base 11, upon which the tank rests.

Within the tank and dividing the same into compartments there is a partition wall 12. As illustrated the bottom walls 13 and 14 of the tank are built at an inclination so that the same will be self draining. The compartments into which the interior of the tank is divided by the partition wall 12 are designated at 15 and 16, respectively. Adjacent the partition wall 12 at the front of the tank there are discharge openings 17 and 18, provided respectively with doors or closers 19 and 20, for the purpose as will be understood of draining the compartments when this is necessary or advisable.

Also as illustrated the washer includes a washer drum, and a rinser drum. The washer drum preferably comprises a plurality of rings or bands, which may be suitably flanged the rings being indicated at 21 and 22, and having connected thereto a plurality of slats 23. These slats are secured to the rings in suitably spaced positions by any means whatsoever. Extending across the rings there are cross-bars 24 and 25. These cross bars are provided with openings through which a shaft 26 passes and upon which shaft the washer drum is mounted. At one end this shaft 26 extends through the end wall of the tank, or above the same as the case may be, and is journaled in bearings 27 and 28. At the opposite end the shaft 26 also extends through or above the other end wall of the tank and is journaled in bearing 29. The bearings 27 and 28 are mounted in standards 30 and 31, and the bearing 29 in a standard 32.

The end of the washer drum adjacent the end wall of the tank is open. At the opposite end of the washer drum, that is, the end thereof adjacent the partition wall 12, the washer drum is provided with a wall 33. In this wall 33 there is an opening 34; this opening 34 is preferably made in the form of a quadrant, and is adapted to be covered or uncovered by a door 35, provided with suitable slots 36, and mounted on hinges 37 so as to swing from a closed position in which the opening 34 is shut to a position in which the opening is uncovered and the door rests against a sector shaped stop 38, in which position the door acts as a slide to pick up and transfer the roots, vegetables or other articles from the washer drum to the next succeeding drum. The position of this door 35 may be determined and controlled by means of a rod 39 mounted to slide in brackets 40 and 41, and pivoted as indicated at one end at 42 to the said door, and provided at the other end with a handle 43, which lies exteriorly of the washer drum so as to be readily accessible, and by means of which the rod may be moved longitudinally of the drum to swing the door from a closed to an open position, and vice versa. To maintain the door in either one of said positions the handle end of the rod may be hooked over suitable latches or otherwise.

The other drum or the rinser drum as illustrated is similarly constructed. This comprises flanged rings 44 and 45 having crossbars or spokes 46 and 47, extending diametrically across the rings, in which centrally the drum is mounted on the shaft 26. Connected exteriorly of the rings 44 and 45 there is a plurality of spaced slats 48. The end of the rinser drum adjacent the partition wall 12 is open, and at the opposite end adjacent the end wall of the tank the rinser drum is provided with a wall 49. In this wall 49 there is an opening 50. This opening is also preferably made in the form of a quadrant. Adjacent the opening 50 a bracket 51 is suitably connected to the wall 49. This bracket which functions as a discharge chute is preferably fixed in position, and is provided with a plurality of slots 52 for the purpose of draining the bracket.

The drums as hereinbefore described may be turned by any suitable mechanism and at any desired speed. As illustrated in the drawing, and particularly in Figs. 1 and 2 this actuating mechanism may comprise a drive-shaft 53, journaled in suitable bearings 54 and 55, and upon which there is mounted a pulley 56, and idler 57. Through the pulley the drive-shaft may be turned from any suitable source of power by a belt 58, and the belt may be shifted from the pulley to the idler, and vice versa, by a belt shifter 59 or otherwise. On the drive-shaft 53 there is a sprocket 60. Passing over this sprocket is a chain 61, which also passes over a sprocket 62, fixed on a counter-shaft 63. On the counter-shaft 63 there is a pinion 64, and this pinion 64 meshes with a gear 65, suitably connected on the drum shaft 26. It will be understood of course, that this drive mechanism is merely illustrative, as other equivalent devices may be employed without reference to the present invention. It will also be apparent that this mechanism may be such as to cause the washer and rinser drums to turn at any desired speed.

At one end of the apparatus I employ a chute 66, having suitable sides 67, and upon which the articles to be cleaned are placed and permitted to slide into the washer drum. The tank is supplied with water or other cleansing fluid to any desired height, and as the drums revolve the articles are agitated and washed by coming into contact with the water or cleansing fluid. During this preliminary washing the door 35 is preferably closed, then after a predetermined period this door is opened and maintained in its open position. In the revolution of the drum this door then acts to carry the articles upwardly against the partition wall 12, and when the articles have been raised sufficiently far to clear this partition wall they will slide from this door, which then acts as a chute, into the rinser drum, passing through the opening 34 in the wall 33. The articles are agitated in a similar manner in the rinser drum and carried upwardly by the bracket 51 until they clear the end wall of the tank, when they are delivered through the opening 50 to a discharge chute 68 fitted with suitable sides 69 to direct the passage of the articles on the chute to any desired receptacle. Furthermore, it will be understood that from time to time as may be necessary the doors 19 and 20 may be opened, and the earth and other dirt which accumulates in the compartments of the tank may be washed therefrom.

I claim as my invention:

1. In an apparatus of the class described, a tank, a washer drum revolubly mounted in the tank, a wall having an opening therein at one end of the washer drum, a rinser drum also revolubly mounted in the tank, and a door adapted in one position to close the opening in the said wall at the end of the washer drum and in another position to act as a slide for the transfer of articles from the washer drum to the rinser drum.

2. In an apparatus of the class described, a tank, a partition wall dividing the tank into separate compartments, a washer drum in one compartment, a wall having an opening therein at one end of the washer drum, a rinser drum in another compartment, a door adapted when in one position to close the opening in the wall of the washer drum and when in another position to act as a slide for the transfer of articles from the washer drum to the rinser drum, and means for opening and closing and maintaining the said door in place in both its open and closed positions.

3. In an apparatus of the class described, a tank, a partition wall dividing the tank into separate compartments, a washer drum in one compartment, and being open at one end, and having a wall having an opening therein at the other end, a rinser drum in the other compartment, also being open at one end, and having a wall at the opposite end, a shaft upon which the said drums are mounted, means for turning the said shaft, devices associated with the wall at one end of the washer drum for normally closing the opening in the same when in one position, and for acting as a slide when in another position to transfer articles from the washer drum to the rinser drum, and a device associated with the wall at the end of the rinser drum for automatically delivering the articles therefrom.

Signed by me this 28th day of July, 1925.

MATTHEW L. FOX.